Dec. 17, 1957          H. B. CHURCH          2,816,539
HEATED HANDLE
Filed April 6, 1956
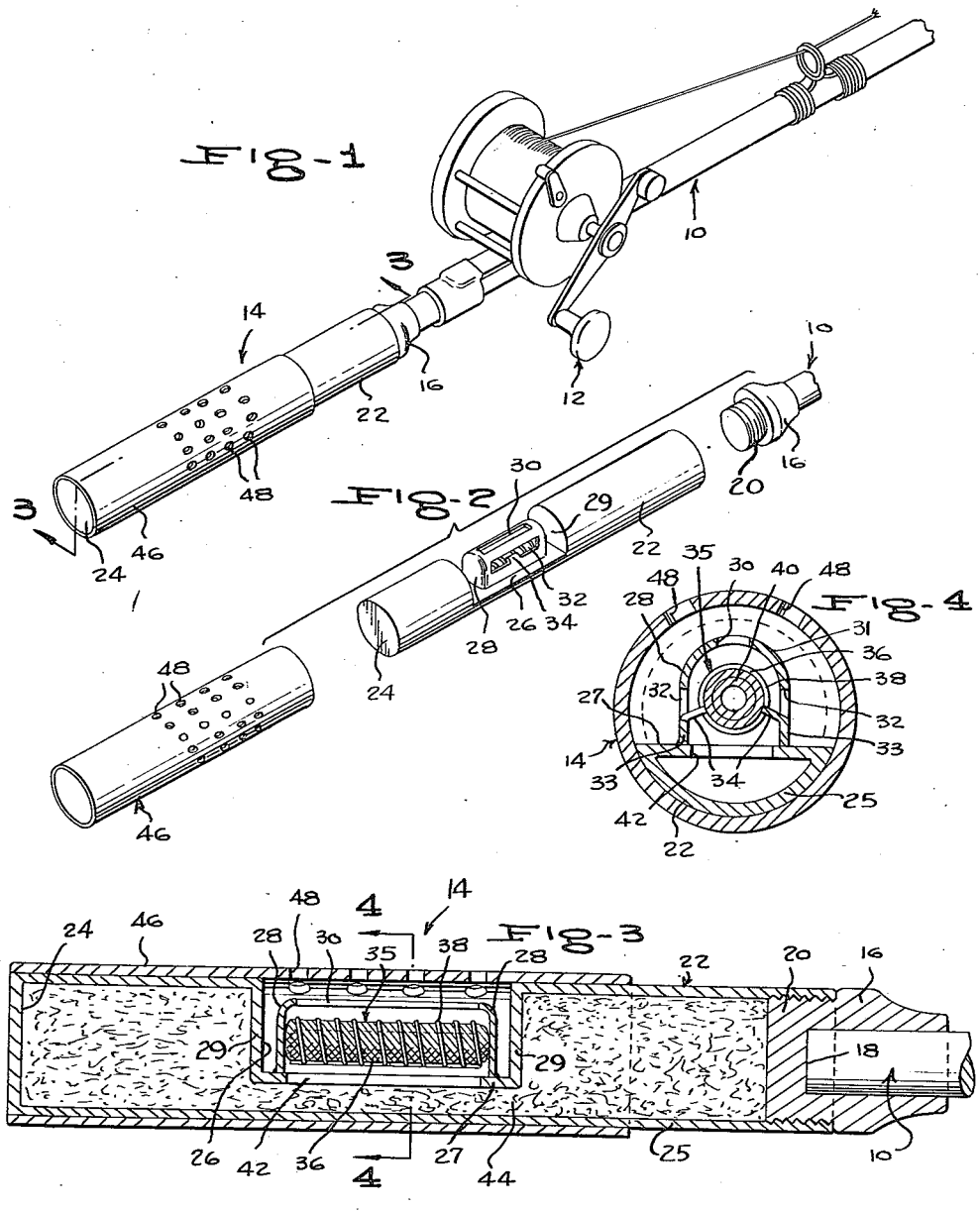
INVENTOR.
HAL B. CHURCH
BY
McMorrow, Berman + Davidson
ATTORNEYS

United States Patent Office 2,816,539
Patented Dec. 17, 1957

2,816,539

HEATED HANDLE

Hal B. Church, Okemos, Mich.

Application April 6, 1956, Serial No. 576,596

2 Claims. (Cl. 126—208)

This invention relates to an improved self-heated handle.

The primary object of the invention is to provide a safer, more practical, reliable, and efficient device of this kind which is adapted to replace or to provide a cold-weather handle for various manually manipulated members, such as fishing rods, levers, and other implements, the device being simple in structure, composed of a minimum number of simple parts, and capable of being made in attractive, rugged and serviceable forms at relatively low cost.

Other important objects and advantageous features of the invention will be apparent from the following description and the accompanying drawings, wherein, for purposes of illustration only, a specific form of the invention is set forth in detail.

Figure 1 is a fragmentary perspective view showing a fishing rod equipped with a heated handle in accordance with the present invention;

Figure 2 is an exploded perspective view of the handle per se;

Figure 3 is an enlarged longitudinal section on line 3—3 of Figure 1; and

Figure 4 is a still further enlarged transverse section on line 4—4 of Figure 3.

Referring in detail to the drawings, the numeral 10 designates a fishing rod having a reel 12 thereon, and equipped with a heated handle 14 in accordance with the present invention. The handle 14 includes a plug 16 in its forward end having a forwardly opening axial socket 18 in which is press-fitted or otherwise fixedly engaged the rear end of the rod 10, after removal of the regular handle.

The handle 14 comprises an elongated inner cylinder 22 into whose forward end a reduced threaded terminal 20 of the plug 16 is threaded. The rear end of the inner cylinder 22 is closed by a rear end wall 24. The side wall 25 of the inner cylinder 22 is interrupted at a point intermediate the ends of the cylinder 22 to provide a longitudinal, substantially semi-cylindrical recess 26 defined by a flat longitudinal bottom wall 27 and substantially semi-circular end walls 29, 29 joining the ends of the bottom wall 27 to the side wall 25. A longitudinally elongated hollow burner housing 28, narrower than the recess bottom wall, is secured on the bottom wall and overlies a longitudinal slot 42 provided centrally in the bottom wall 27. The housing 28 has an arcuate top wall 31 provided with a longitudinal slot 30, and parallel side walls 33 provided with longitudinal slots 32. Inwardly bent ears 34 on the lower edges of the slots 32 clamp between them a cylindrical burner 35 comprising an absorbent non-flammable outer sleeve 36 extending within a coil spring 38, and an inner sleeve 40 also of absorbent, non-flammable material engaged in the outer sleeve 36. The interior of the inner cylinder 22 is packed with such as cotton wadding 44 or other absorbent material adapted to be saturated with a volatile combustible fluid, such as pocket lighter fluid. Telescoped onto the rear end of the inner cylinder 22 is an outer, elongated cylinder or cap 46, which is open at both ends and has intermediate its ends a group of vent holes 48 arranged to register with the recess 26 when the cap is in the full forward position shown in Figure 3.

The burner 35 becomes sufficiently impregnated with combustible substance by transfer thereof from the wadding 44 through the slot 42, to be ignitable by a match or like applied to a slot of the burner housing 28, with the cap 46 withdrawn to expose the burner housing 28. Once the burner has been ignited, the cap 46 is moved to its full forward position, so that the recess 26 is covered by the perforated part of the cap. The holes 48 in the cap then supply sufficient air to the burner to sustain combustion, and the handle 14, as a whole, becomes heated.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the invention, and the invention comprehends any minor changes in construction that may be permitted within the scope of the appended claims.

What is claimed is:

1. In a self-heating handle, an elongated inner cylinder having a side wall and forward and rear ends, a plug secured on said forward end for securing the handle to an implement, said rear end being closed, said side wall being interrupted at a point spaced from the ends of the inner cylinder, a recess bottom wall and recess end walls joined to each other and to said side wall so as to define a recess, a longitudinal slot in said bottom wall, a hollow burner housing secured on said bottom wall and overlying said longitudinal slot, said housing having perforated side and top walls, a cylindrical longitudinal burner supported spacedly within said housing, said burner comprising an outer sleeve, a coiled spring surrounding said outer sleeve, and an inner sleeve engaged in said outer sleeve, each of said sleeves being fabricated of absorbent non-inflammable material, a packing of flammable volatile fluid absorbent material in said inner cylinder, and an outer cylinder slidably telescoped on said inner cylinder, said outer cylinder having a group of vent holes intermediate its ends, the outer cylinder being arranged to be moved endwise to expose said recess and the burner housing and to be moved endwise to register said group of vent holes with the recess.

2. In a self-heating handle, an elongated inner cylinder having a side wall and forward and rear ends, a plug secured on said forward end for securing the handle to an implement, said rear end being closed, said side walls being interrupted at a point spaced from the ends of the inner cylinder, a recess bottom wall and recess end walls joined to each other and to said side wall so as to define a recess, a longitudinal slot in said bottom wall, a hollow burner housing secured on said bottom wall and overlying said longitudinal slot, said housing having perforated side and top walls, a cylindrical longitudinal burner supported spacedly within said housing, said burner comprising an outer sleeve, a coiled spring surrounding said outer sleeve, and an inner sleeve engaged in said outer sleeve, each of said sleeves being fabricated of absorbent non-inflammable material, a packing of flammable volatile absorbent material in said outer cylinder, and an outer cylinder slidably telescoped on said inner cylinder, said outer cylinder having a group of vent holes intermediate its ends, the outer cylinder being arranged to be moved endwise to expose said recess and the burner housing and to be moved endwise to register said group of vent holes with the recess, said outer cylinder on being completely telescoped upon said cylinder having a rear end wall in alignment with the rear wall of the inner cylinder whereby the vent holes are registered with the recess of the inner cylinder.

References Cited in the file of this patent

UNITED STATES PATENTS

| | | |
|---|---|---|
| 70,506 | Beebe | Nov. 5, 1867 |
| 370,496 | Seliger | Sept. 27, 1887 |
| 518,590 | Deninger | Apr. 24, 1894 |
| 835,150 | Bowditch | Nov. 6, 1906 |
| 1,930,501 | Aronson | Oct. 17, 1933 |
| 2,670,728 | Smith | Mar. 2, 1954 |
| 2,683,478 | Seelig | July 13, 1954 |
| 2,758,592 | Phipps | Aug. 14, 1956 |

FOREIGN PATENTS

| | | |
|---|---|---|
| 25,347 | Great Britain | 1896 |